United States Patent
Yuuki

[11] Patent Number: 5,966,484
[45] Date of Patent: Oct. 12, 1999

[54] LIGHT BRANCHING AND COUPLING DEVICE

[75] Inventor: Hayato Yuuki, Yokkaichi, Japan

[73] Assignee: Sumitomo Wiring Systems, Ltd., Yokkaichi, Japan

[21] Appl. No.: 08/932,548

[22] Filed: Sep. 17, 1997

Related U.S. Application Data

[62] Division of application No. 08/661,362, Jun. 11, 1996, Pat. No. 5,675,679.

[30] Foreign Application Priority Data

Jul. 3, 1995 [JP] Japan ................................. 7-167612
Oct. 30, 1995 [JP] Japan ................................. 7-281997

[51] Int. Cl.$^6$ ............................................... G02B 6/26
[52] U.S. Cl. ............................................... 385/43; 385/96
[58] Field of Search ................................ 385/2, 24, 42, 385/43, 45, 46, 17, 95, 96, 99, 51; 65/411

[56] References Cited

U.S. PATENT DOCUMENTS

| | | | |
|---|---|---|---|
| 4,265,689 | 5/1981 | Jeffrey ................................. | 385/96 |
| 4,556,279 | 12/1985 | Shaw et al. ............................ | 385/30 |
| 4,560,427 | 12/1985 | Flood ................................... | 156/73.3 |
| 4,686,136 | 8/1987 | Homonoff et al. ...................... | 156/73.3 |
| 4,755,037 | 7/1988 | Bjornlie et al. ........................ | 350/96.15 |
| 4,867,519 | 9/1989 | Le Roy et al. ......................... | 385/24 |
| 4,869,570 | 9/1989 | Yokohama et al. ..................... | 385/24 |
| 4,923,268 | 5/1990 | Xu ...................................... | 385/50 |
| 4,997,247 | 3/1991 | Stowe .................................. | 385/50 |
| 5,146,520 | 9/1992 | Yuuki et al. ........................... | 385/45 |
| 5,179,603 | 1/1993 | Hall et al. ............................. | 385/43 |
| 5,255,335 | 10/1993 | Saaki et al. ............................ | 385/43 |
| 5,408,555 | 4/1995 | Fielding et al. ......................... | 385/43 |
| 5,412,745 | 5/1995 | Weidman et al. ....................... | 385/43 |
| 5,420,949 | 5/1995 | Arima et al. ............................ | 385/43 |
| 5,448,673 | 9/1995 | Murphy et al. .......................... | 385/43 |
| 5,479,546 | 12/1995 | Dmais et al. ........................... | 385/43 |
| 5,496,390 | 3/1996 | Arima et al. ............................ | 385/43 |
| 5,553,179 | 9/1996 | Cryan et al. ............................ | 385/43 |

FOREIGN PATENT DOCUMENTS

| | | |
|---|---|---|
| 0 266 040 A2 | 5/1988 | European Pat. Off. . |
| 0 363 853 A1 | 4/1990 | European Pat. Off. . |
| 0 418 871 A2 | 3/1991 | European Pat. Off. . |
| 29 37 580 A1 | 9/1979 | Germany . |
| 51-14031 | 2/1976 | Japan . |
| 63-236116 | 9/1988 | Japan . |
| WO 89/02608 | 3/1989 | WIPO . |

OTHER PUBLICATIONS

K. Imoto, et al., "Plastic OPtical Fiber Star Coupler", Applied Optics, vol. 25, No. 19, (1986).

Monomode–Schmelzkoppler für die Lichtwellenleiter–Kommunikationstechnik, by Dieter Eberlein and Gerald Nürnberger, Nachrichtentech., Elektron, Berlin 42 (1992) 5; pp. 188–191.

*Primary Examiner*—Hung N. Ngo
*Attorney, Agent, or Firm*—Oliff & Berridge, PLC

[57] ABSTRACT

A light branching and coupling device excellent both in transmitting performance and in distributing performance in which the intermediate portion of an optical fiber 10a (10b) is thermally drawn to form light transmission fiber portions 11a and 15a (11b and 15b) and a light branching and coupling fiber portion 13a (13b) having a diameter smaller than that of the light transmission fiber portions and, at the same time, form tapering fiber portions 12a and 14a (12b and 14b) between the light transmission fiber portions and the light branching and coupling fiber portion so that the tapering fiber portions are tapered off gradually toward the light branching and coupling fiber portion 13a (13b) side. The light branching and coupling fiber portions 13a and 13b thus formed are fused with each other.

6 Claims, 13 Drawing Sheets

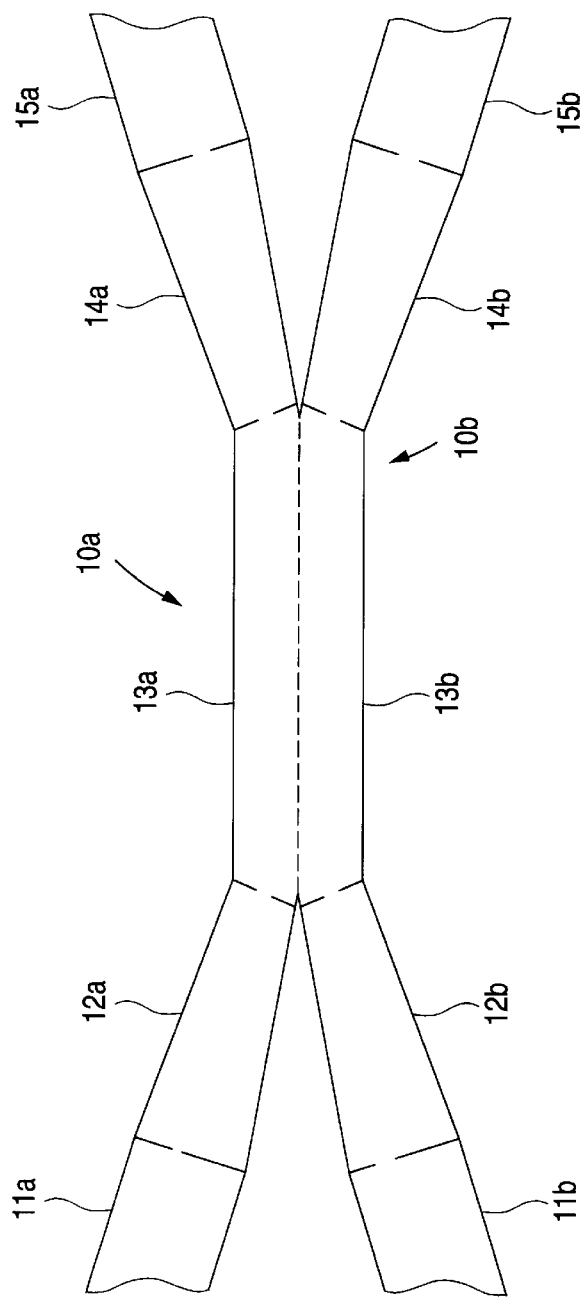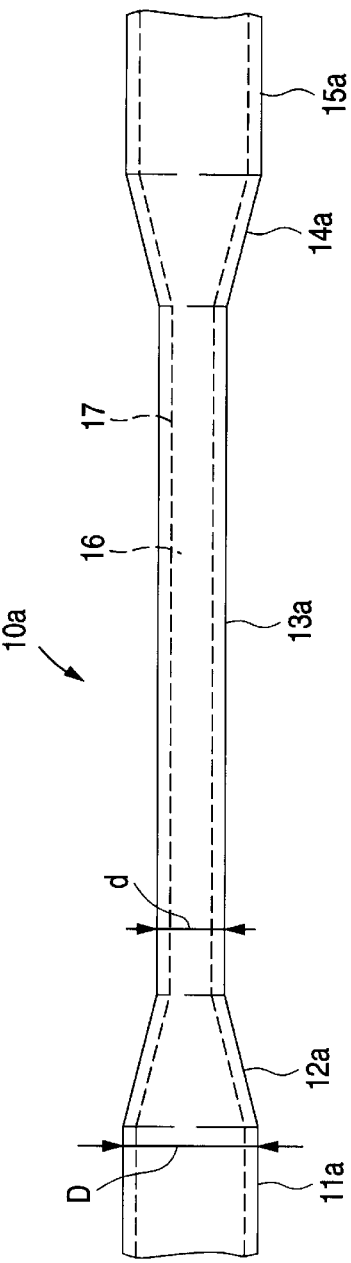

LIGHT BRANCHING AND COUPLING DEVICE

This is a Division of application Ser. No. 08/661,362 filed Jun. 11, 1996 U.S. Pat. No. 5,675,679.

BACKGROUND OF THE INVENTION

The present invention relates to a light branching and coupling device for performing light distribution or coupling in optical fiber communication, or the like.

Conventionally, a light branching and coupling device as shown in FIG. 16 is used for distributing light advancing in an optical fiber.

The light branching and coupling device is formed by thermally fusing light branching and coupling fiber portions 152a of a pair of optical fibers 152, 152 each of which has a core 150 coated with a clad 151.

In such a light branching and coupling device, as shown in FIG. 17, the critical angle θ of light 160 advancing in the optical fiber 152 with respect to the fiber optical axis becomes small if the numerical aperture (NA) of the optical fiber 152 is set to be small. As a result, the light 160 becomes difficult to go into and out of the boundary surface between the light branching and coupling fiber portions 152a, 152a. There arises a problem that the distributing performance of the light branching and coupling device becomes poor.

Therefore, as shown in FIG. 16, when the numerical aperture (NA) of the optical fiber 152 is set to be large to thereby increase the critical angle θ of light 160 so that the light 160 can easily go into and out of the boundary surface between the light branching and coupling fiber portions 152a, 152a, the distributing performance of the light branching and coupling device is improved.

On the other hand, from the point of view of transmitting performance of light 160 in the light transmission fiber portion 152b as a region other than the light branching and coupling fiber portion 152a of the optical fiber 152, the critical angle θ of light 160 increases if the numerical aperture of the optical fiber 152 is set to be large. Accordingly, the path of the light 160 also increases if the number of times of reflection of light 160 in the optical fiber 152 increases. There arises a problem that the loss of light 160 and the distortion of waveform increase.

Therefore, to prevent the loss of the light 160 and the distortion of waveform and attain widening the range of light from the point of view of the light transmitting performance, the numerical aperture is preferably set to be small to thereby reduce the critical reflection angle θ of the light 160.

As described above, it is necessary that the numerical aperture of the optical fiber is set to be large in order to improve the distributing performance of the light branching and coupling device whereas it is necessary to set the numerical aperture of the optical fiber to be small in order to improve the light transmitting performance of the optical fiber per se.

It is however extremely difficult to obtain a light branching and coupling device which satisfies such antinomical requirements.

SUMMARY OF THE INVENTION

The present invention has been achieved in order to solve the aforementioned problems, and it is an object of the present invention to provide a light branching and coupling device in which good distributing performance or coupling performance can be obtained without lowering light transmitting performance.

To solve the aforementioned problems, the light branching and coupling device according to the invention is formed by fusing a plurality of optical fibers having light transmission fiber portions and light branching and coupling fiber portions with each other at the light branching and coupling fiber portions, in that the diameter of the light branching and coupling fiber portions is set to be smaller than the diameter of the light transmission fiber portions, and tapering fiber portions are continuously formed between the light branching and coupling fiber portions and the light transmission fiber portions so that the outer circumference surfaces of the tapering fiber portions are gradually tapered off to reduce the diameter toward the light branching and coupling fiber portion side.

Further, the light branching and coupling device is constituted by at least three optical fibers, and a plurality of fused portions in which light branching and coupling fiber portions of predetermined ones of the optical fibers are partially fused with each other may be provided along the axial direction of the light branching and coupling fiber portions of the predetermined optical fibers.

Further, the optical fibers may be fused in the form like a star or a tree.

Further, the light transmission fiber portions, the tapering fiber portions and the light branching and coupling fiber portions may be formed integrally with each other.

Further, the inclination of the circumferential surface of the tapering fiber portion with respect to the fiber optical axis and the length of the tapering fiber portion may be set so that light advancing in the light branching and coupling fiber portion at an angle of $\theta_2$ with respect to the fiber optical axis satisfies the following condition in which the light is fully reflected by the outer circumference of a clad of the light branching and coupling fiber portion:

$$\theta_2 \leq \sin^{-1}(1/n_2)$$

when the optical fiber is formed of a core coated with a clad of a refractive index $n_2$.

The above-mentioned inclination of the tapering fiber portion with respect to the fiber optical axis and the length of the tapering fiber portion may be such that, for example, the inclination angle ψ of the circumferential surface of the tapering fiber portion with respect to the fiber optical axis may be set as follows:

$$\psi = (\theta_2 - \theta_1)/2$$

when the critical angle of light advancing in the light transmission fiber portion with respect to the fiber optical axis is $\theta_1$.

The length h of the tapering fiber portion may be set as follows:

$$h = D/(\tan\psi + \tan\theta_2)$$

when the diameter of the light transmission fiber portion is D.

Further, an optical adhesive agent having a refractive index smaller than that of the clad of the optical fibers may be applied onto the circumferences of the light branching and coupling fiber portions fused with each other and onto the circumferences of the tapering fiber portions.

Further, an optical adhesive agent may be applied onto the circumferences of the light branching and coupling fiber portions fused with each other and onto the circumferences of the tapering fiber portions, wherein the optical adhesive agent has a refractive index $n_3$ which satisfies the condition $$n_3 < n_2 \cdot \sin \theta_2$$

where the angle $\theta_2$ of light advancing in the light branching and coupling fiber portion with respect to the fiber optical axis is given as follows:

$$\theta_2 < \sin^{-1}(1/n_2).$$

BRIEF DESCRIPTION OF THE DRAWINGS

FIG. 1 is a plan view showing a light branching and coupling device in a first embodiment according to the present invention;

FIG. 2 is a plan view showing optical fibers in the same device;

DETAILED DESCRIPTION OF PREFERRED EMBODIMENTS

First Embodiment

Figure 3:
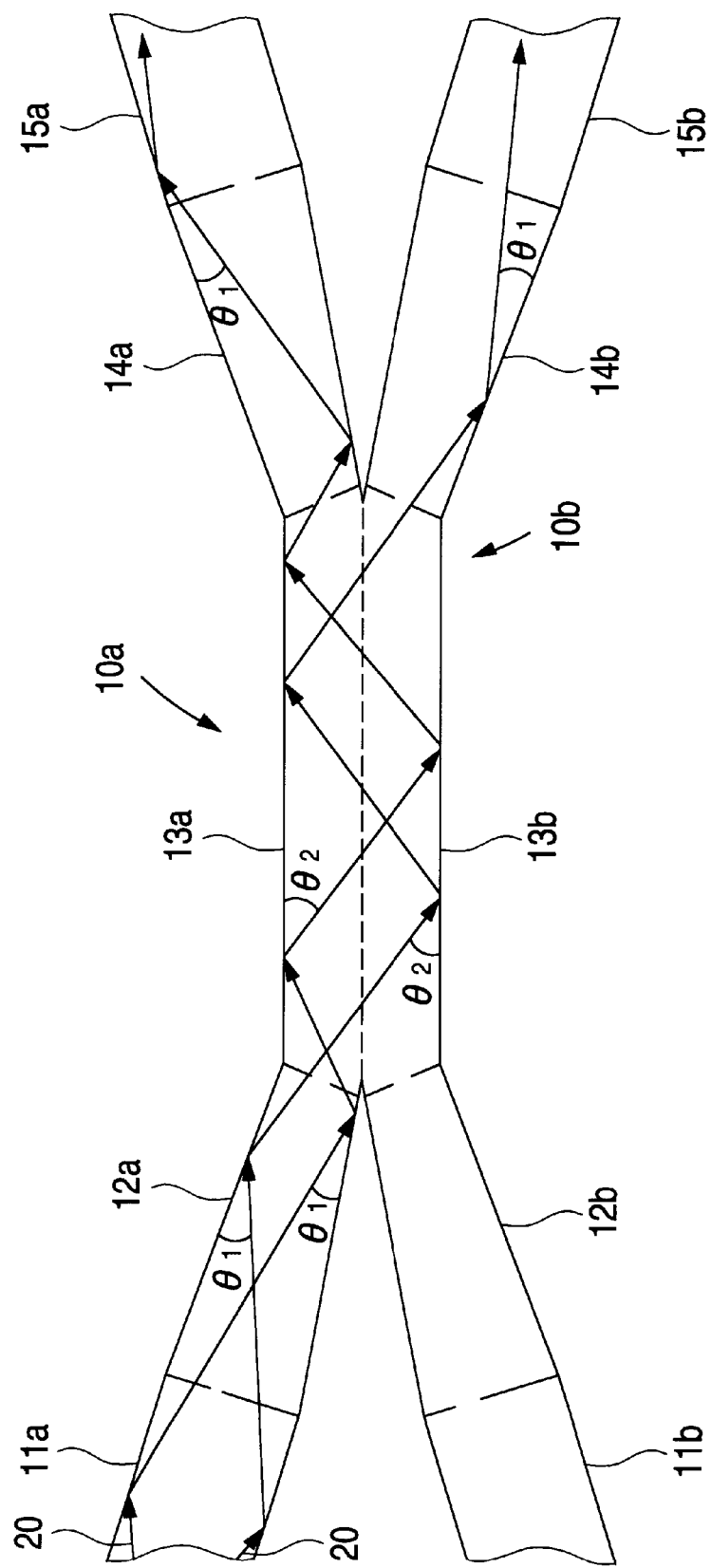
FIG. 3 is an explanatory view showing the inside of the same light branching and coupling device.

A first embodiment according to the present invention will be described below with reference to the drawings. As shown in FIGS. 1 and 2, this light branching and coupling device comprises a pair of plastic optical fibers 10a and 10b having light branching and coupling fiber portions 13a and 13b ultrasonically fused with each other.

The aforementioned optical fiber 10a is formed of a core 16 of a refractive index $n_1$ coated at its circumference with a clad 17 of a refractive index $n_2$. The center portion of the optical fiber 10a is heated and drawn to form the light branching and coupling fiber portion 13a and, at the same time, to form light transmission fiber portions 11a and 15a on opposite end sides of the light branching and coupling fiber portion 13a.

The diameter d of the aforementioned light branching and coupling fiber portion 13a is set to be smaller than the diameter D of the light transmission fiber portions 11a and 15a and, at the same time, tapering fiber portions 12a and 14a of the same shape are formed continuously between the light branching and coupling fiber portion 13a and the light transmission fiber portion 11a and between the light branching and coupling fiber portion 13a and the light transmission fiber portion 15a respectively so that the outer circumference of each of the tapering fiber portions 12a and 14a are gradually reduced in diameter toward the light branching and coupling fiber portion 13a.

The light branching and coupling fiber portion 13a of the optical fiber 10a and the light branching and coupling fiber portion 13b of the optical fiber 10b formed in the same manner as the optical fiber 10a are fused ultrasonically with each other substantially over the whole areas thereof.

In the following, the paths of light branched by the light branching and coupling device thus configured will be described. As shown in FIG. 3, when light 20 which advances in the light transmission fiber portion 11a at a critical angle $\theta_1$ with respect to the fiber optical axis enters the input side of tapering fiber portion 12a and is reflected by the circumferential surface of the tapering fiber portion 12a, the angle of the light 20 with respect to the fiber optical axis is converted into a larger angle $\theta_2$.

When this light 20 enters the output side of tapering fiber portion 14a (14b) and is reflected by the circumferential surface of the tapering fiber portion 14a (14b) after the light 20 goes into and out of the boundary surface between the light branching and coupling fiber portions 13a and 13b, the angle $\theta_2$ of the light 20 with respect to the fiber optical axis is now converted into the angle $\theta_1$ and then the light 20 advances in the light transmission fiber portion 15a (15b).

In the following, the setting of the inclination angle $\psi$ of the tapering fiber portions 12a and 14a (12b and 14b) with respect to the fiber optical axis, the length h thereof and the diameter d of the light branching and coupling fiber portion 13a (13b) will be described.

Figure 4:
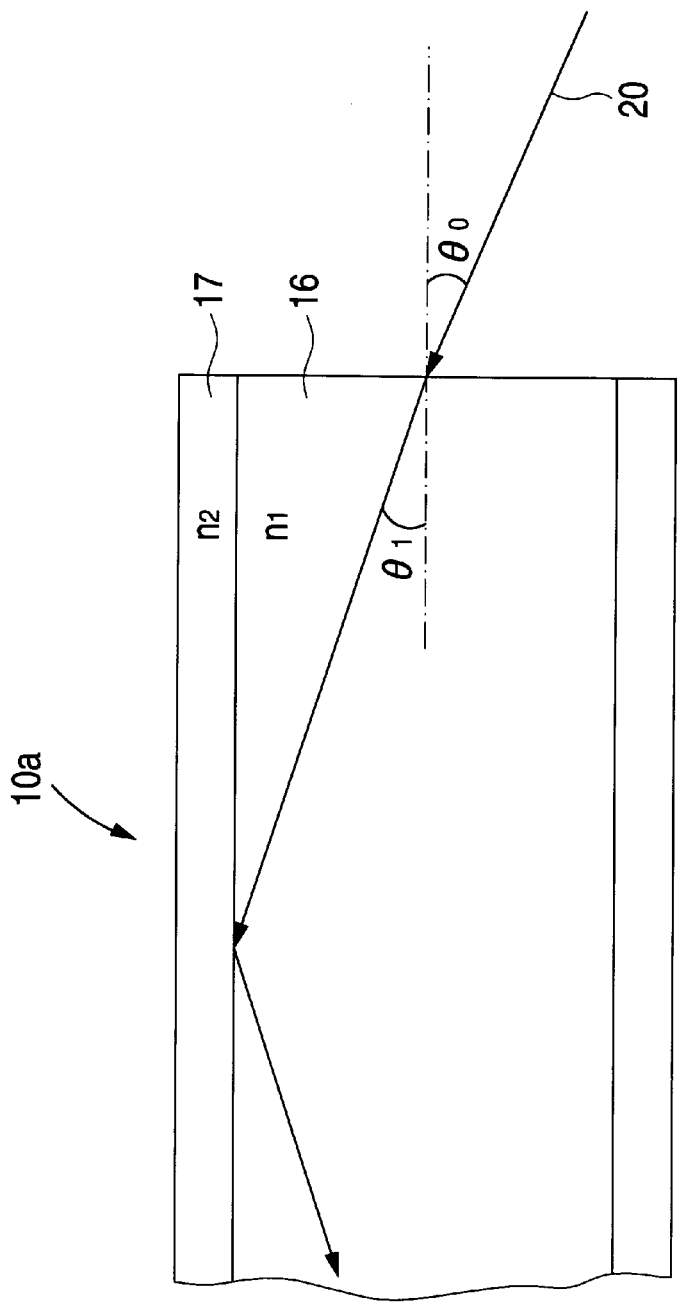
FIG. 4 is a sectional view in an end portion of an optical fiber in the same device.

As shown in FIG. 4, the numerical aperture NA of the optical fiber 10a composed of a core 16 of a refractive index $n_1$ and a clad 17 of a refractive index $n_2$ is first given as follows:

$$NA = \sin \theta_0 = (n_1^2 - n_2^2)^{1/2} \quad (1)$$

in which $\theta_0$ is the angle of light 20 incident on an end surface of the optical fiber 10a.

Assuming now that the refractive index in the air around the optical fiber is 1, then the angle $\theta_1$ between the light 20 entering the optical fiber 10a and the fiber optical axis is given as follows on the basis of Snell laws of refraction.

$$n_1 \cdot \sin \theta_1 = \sin \theta_0 \quad (2)$$

Accordingly, $$\theta_1 = \sin^{-1}\{(n_1^2 - n_2^2)^{1/2}/n_1\} \quad (3)$$

Figure 5:
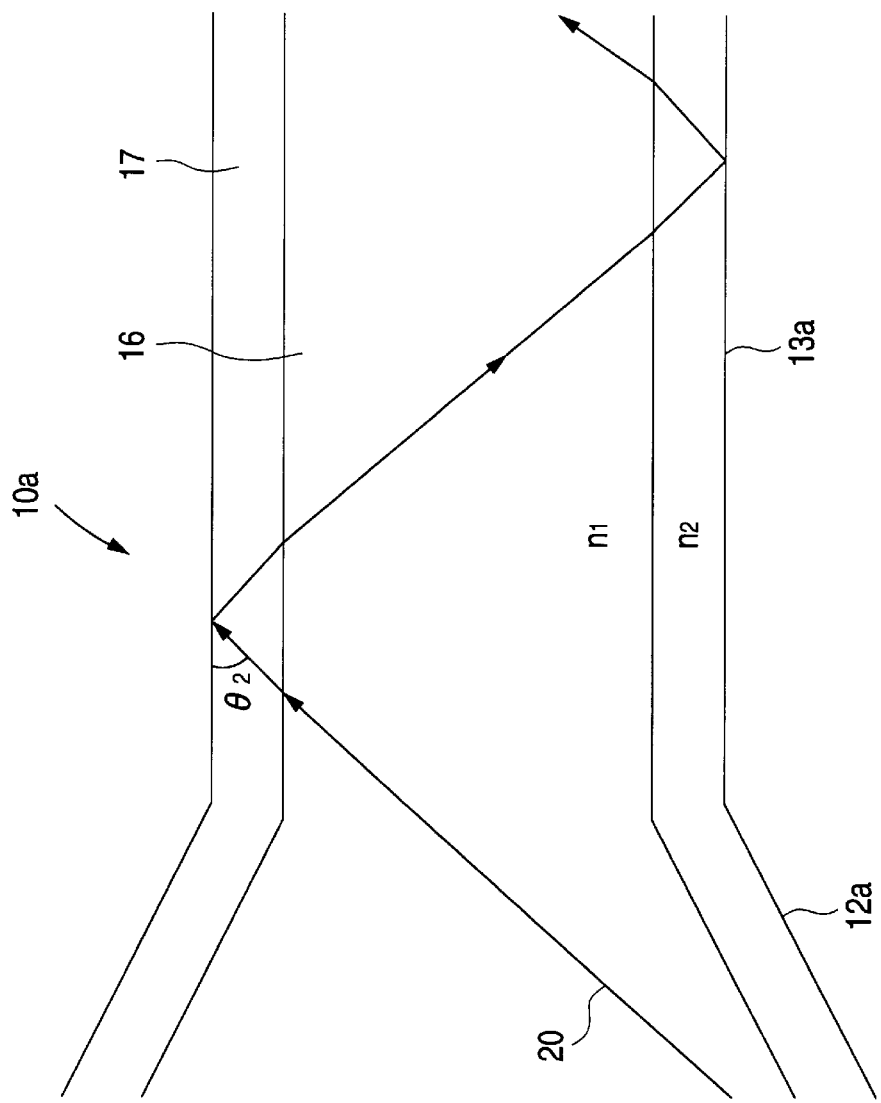
FIG. 5 is an explanatory view in a light branching and coupling fiber portion of the optical fiber in the same device.

As shown in FIG. 5, the light 20 which advances in the light branching and coupling fiber portion 13a while the angle of the light 20 with respect to the fiber optical axis is changed by the tapering fiber portion 12a, must be fully reflected by the outer circumferential surface of the clad 17 of the optical fiber 10a in the light branching and coupling fiber portions 13a and 13b so that the light 20 is prevented from leaking.

Accordingly, when the refractive index in the air around the clad 17 of the optical fiber 10a is 1, the angle $\theta_2$ must be in a range as follows.

$$\theta_1 < \theta_2 \leq \sin^{-1}(1/n_2) \quad (4)$$

Although the angle of the light 20 entering from the core 16 into the clad 17 with respect to the fiber optical axis changes, the change of the angle is neglected because the angle is not increased.

To set the angle of the light 20 with respect to the fiber optical axis to $\theta_2$ when the light 20 advances in the light branching and coupling fiber portions 13a and 13b, for example, the angle ψ of the tapering fiber portion 12a with respect to the fiber optical axis may be set as follows.

Figure 6:
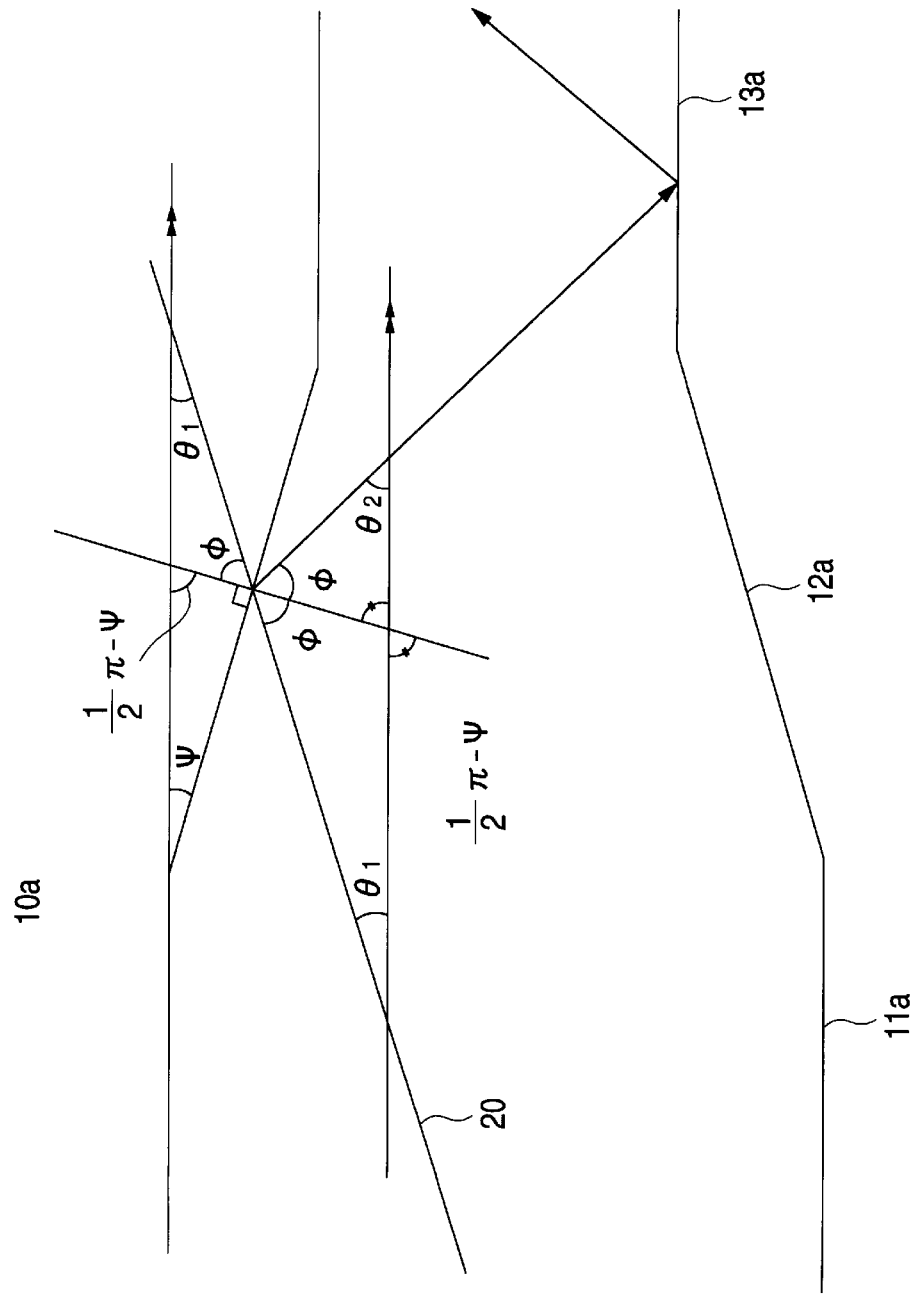
FIG. 6 is an explanatory view showing the state of light propagation in the optical fiber in the same device.

That is, as shown in FIG. 6, when the reflection angle of the light 20 with respect to the circumferential surface of the tapering fiber portion 12a is φ, the following expressions hold.

$$\psi + \theta_1 + \phi + \pi/2 = \pi \quad (5)$$

$$(\pi/2 - \psi) + \theta_2 + \phi = \pi \quad (6)$$

Accordingly, $$\psi = (\theta_2 - \theta_1)/2 \quad (7)$$

In FIG. 6 and in FIG. 7 which will be described later, the thickness of the clad 17 is neglected because the thickness is about 30 μm compared with the diameter 1.0 mm of the optical fiber.

Further, the light 20 is required to be reflected only once by the circumferential surface of the tapering fiber portion 12a because there is a risk that the angle of light with respect to the fiber optical axis may exceed $\theta_2$ to thereby leak the light 20 in the light branching and coupling fiber portions 13a and 13b if the light 20 advancing at the critical angle is reflected several times by the circumferential surface of the tapering fiber portion 12a.

Hence, the length h of the tapering fiber portion 12a may be set as follows.

Figure 7:
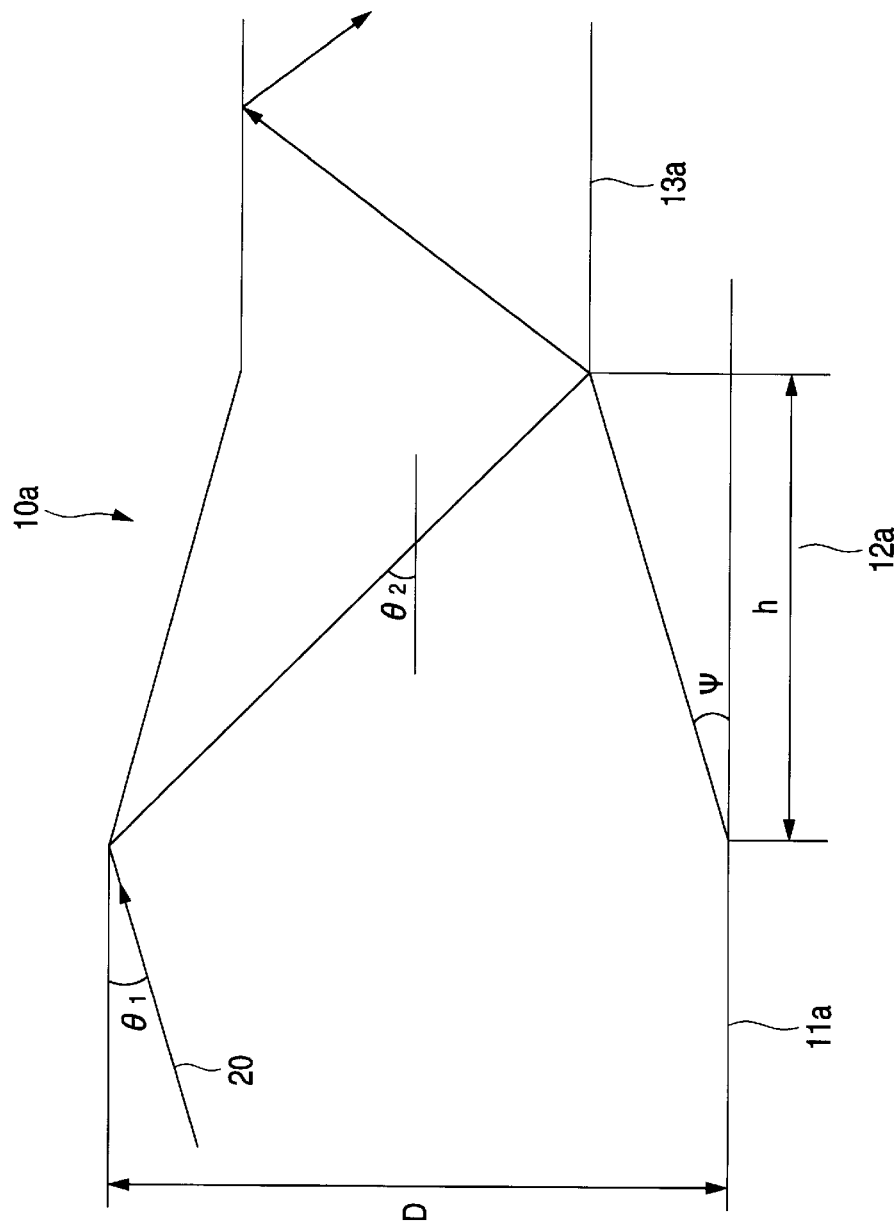
FIG. 7 is an explanatory view showing the state of light propagation in the optical fiber in the same device.

That is, as shown in FIG. 7, the configuration may be designed so that the light 20 reflected by the light transmission fiber portion 11a side end portion circumferential surface of the tapering fiber portion 12a is reflected by the light branching and coupling fiber portion 13a without being reflected again by the circumferential surface of the tapering fiber portion 12a. In this design, the following expression holds.

$$h \cdot \tan \psi + h \cdot \tan \theta_2 = D \quad (8)$$

Hence, $$h = D/(\tan \psi + \tan \theta_2) \quad (9)$$

On the basis of the diameter D of the aforementioned light transmission fiber portion 11a, the inclination angle ψ of the tapering fiber portion 12a and the length h of the tapering fiber portion 12a, the diameter d of the light branching and coupling fiber portion 13a may be set as follows.

$$d = D - 2 \cdot h \cdot \tan \psi \quad (10)$$

The optical fiber 10b is also formed in the same manner as the optical fiber 10a.

In the light branching and coupling device configured as described above, the angle $\theta_2$ of the light 20 of the light branching and coupling fiber portions 13a and 13b with respect to the fiber optical axis can be set to be larger than the angle $\theta_1$ of the light 20 of the light transmission fiber portions 11a, 15a, 11b and 15b with respect to the fiber optical axis by the tapering fiber portions 12a, 14a, 12b and 14b formed at respective opposite ends of the light branching and coupling fiber portions 13a and 13b. Accordingly, the angle $\theta_1$ is small so that the transmitting performance of the light 20 is improved in the light transmission fiber portions 11a, 15a, 11b and 15b, and while, in the light branching and coupling fiber portions 13a and 13b, the angle $\theta_2$ is large so that the light 20 goes into and out of the boundary surface between the light branching and coupling fiber portions 13a and 13b. Accordingly, distributing performance is also improved.

Further, the tapering fiber portions 12a, 14a, 12b and 14b, the light transmission fiber portions 11a, 15a, 11b and 15b and the light branching and coupling fiber portions 13a and 13b are formed so as to be united into one body. Accordingly, the loss of the light 20 is also reduced.

Further, in an optical communication network for high-speed data communication, optical fibers small in numerical aperture are generally used in order to reduce light path difference caused by the difference between reflection angles of light propagated by the optical fibers. This light branching and coupling device is particularly effective in the aforementioned case because distributing performance can be well improved even in the optical fibers small in numerical aperture.

Second Embodiment

Figure 8:
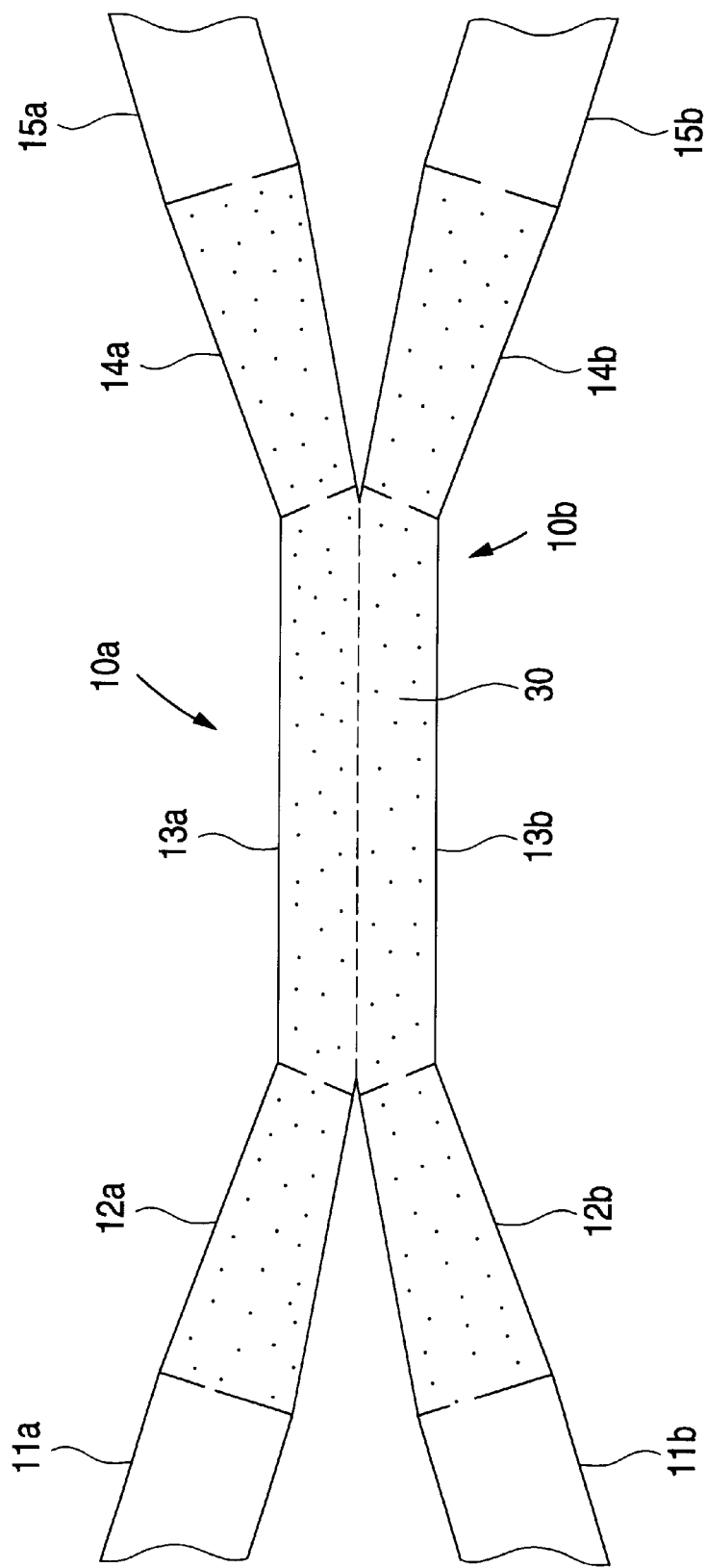
FIG. 8 is a plan view showing a light branching and coupling device in a second embodiment according to the present invention.

Incidentally, because the tapering fiber portions 12a, 14a, 12b and 14b are tapered off to reduce a diameter, there is a risk that these portions 12a 14a 12b and 14b may be bent easily by the action of an external force. Therefore, an optical adhesive agent 30 of a refractive index $n_3$ smaller than the refractive index $n_2$ of the clad 17 may be applied onto the surfaces of the light branching and coupling fiber portions 13a and 13b thermally fused with each other and onto the surfaces of the tapering fiber portions 12a, 14a, 12b and 14b to reinforce the mechanical strength these portions as in a second embodiment shown in FIGS. 8 and 9.

Figure 9:
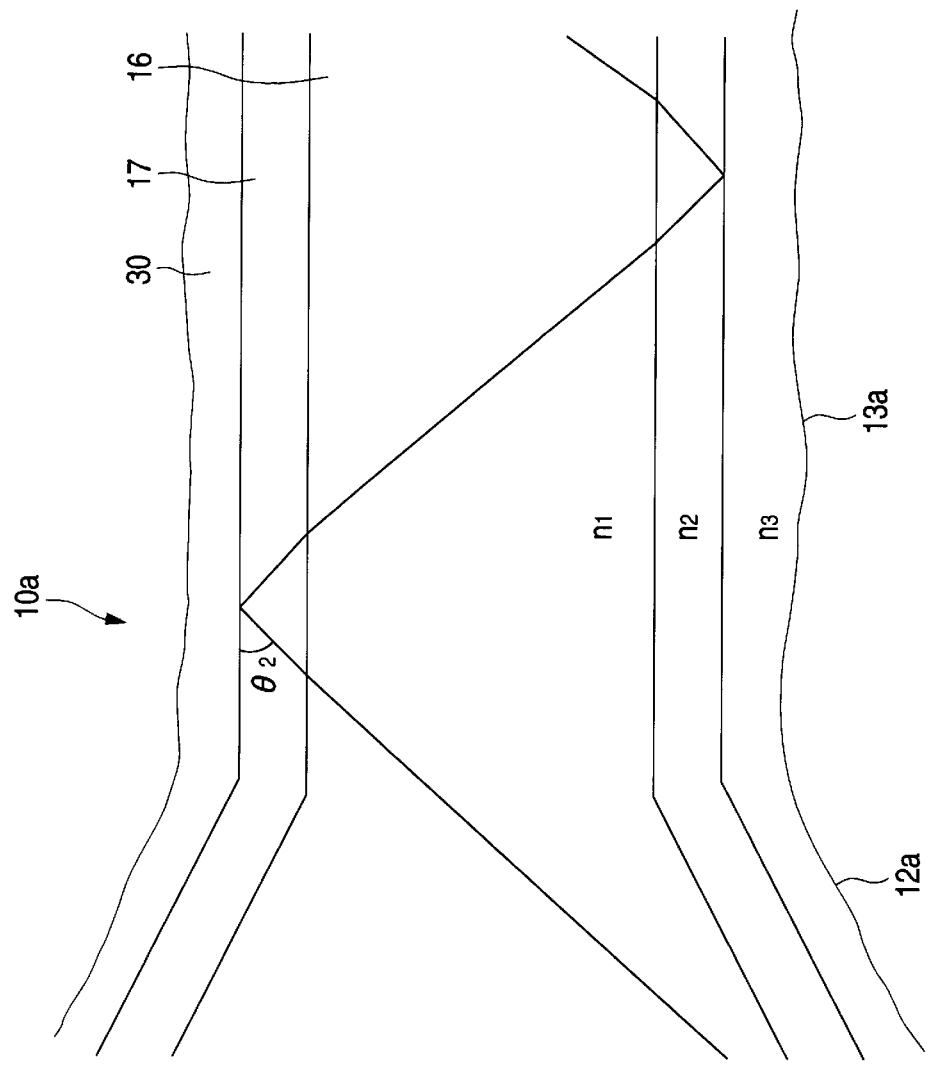
FIG. 9 is an explanatory view showing the state of reflection in the boundary surface between a clad and an optical adhesive agent in the optical fiber in the same device.

In this case, preferably, the refractive index $n_3$ is set to satisfy the following condition so that the light 20 is fully reflected by the boundary surface between the clad 17 and the optical adhesive agent 30 as shown in FIG. 9 when the angle $\theta_2$ between the light 20 advancing in the aforementioned light branching and coupling portions 13a and 13b and the fiber optical axis is in the range:

$$\theta_2 < \sin^{-1}(1/n_2) \quad (11)$$

$$n_3 < n_2 \cdot \cos \theta_2 \quad (12)$$

Third Embodiment

Figure 10:
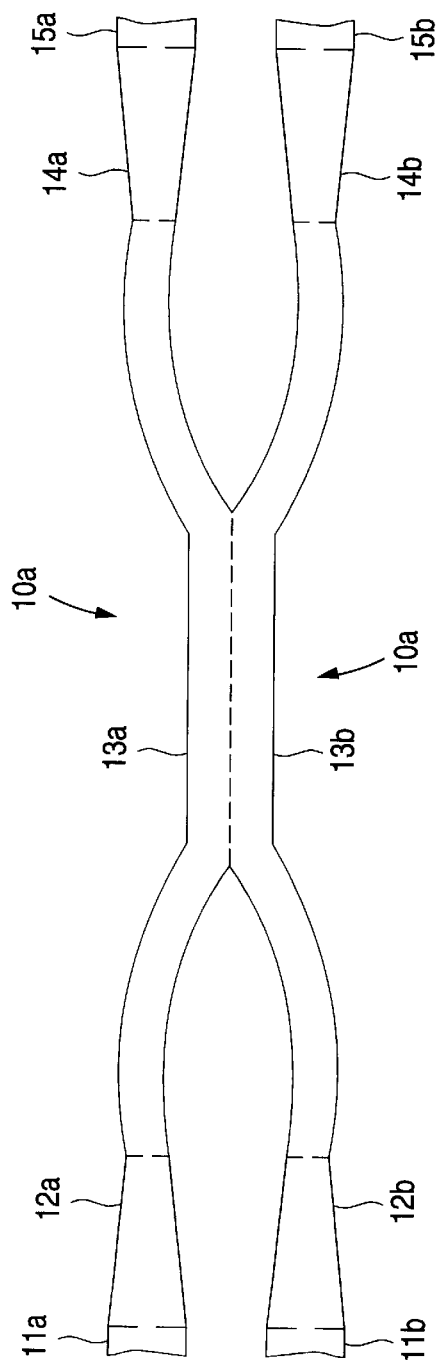
FIG. 10 is a plan view showing a third embodiment according to the present invention.

Further, the light branching and coupling fiber portions 13a and 13b are not necessary to be fused with each other over the whole region thereof. As in a third embodiment shown in FIG. 10, these portions 13a and 13b may be fused with each other only in their center regions. Also in this case, the loss of light decreases as the difference between the length of the fused region and the whole length of the light branching and coupling fiber portions 13a and 13b decreases.

Specific examples of the light branching and coupling device according to the aforementioned first, second and third embodiments will be described below.

Figure 11:
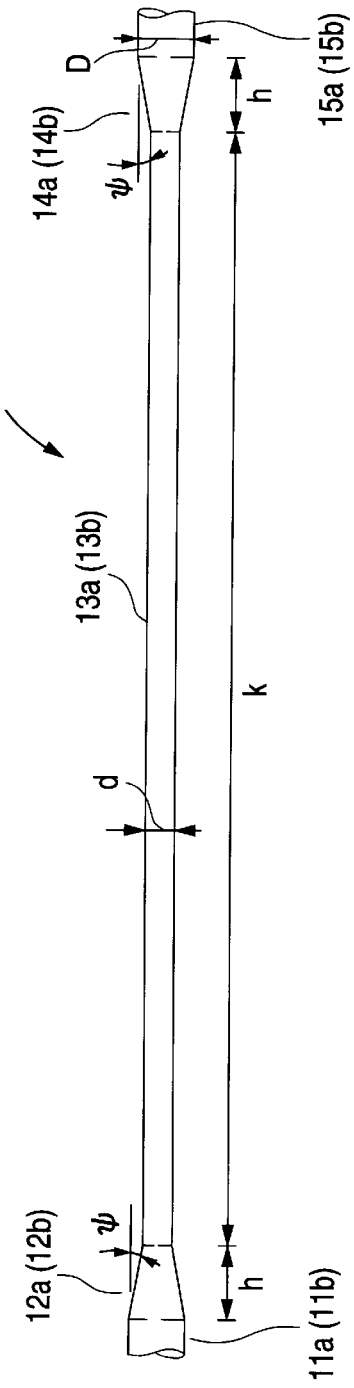
FIG. 11 is a plan view showing a specific example of the third embodiment according to the present invention.
Figure 12:
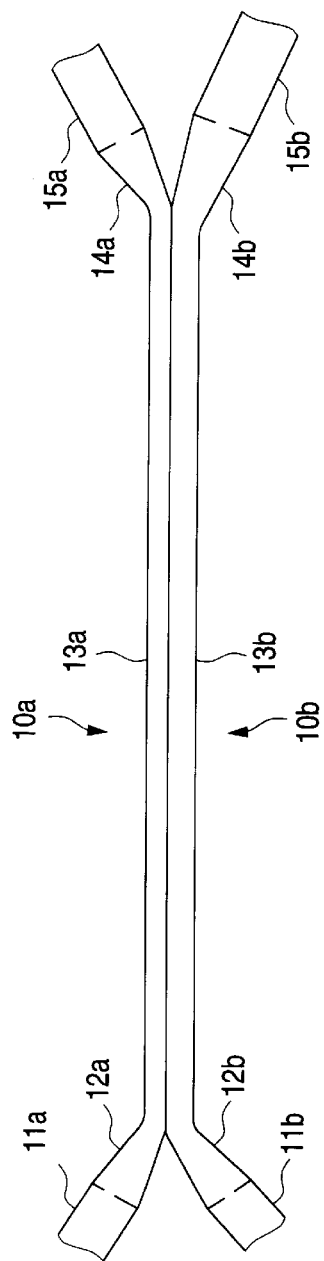
FIG. 12 is a plan view showing the same light branching and coupling device.

As shown in FIGS. 11 and 12, the intermediate portion of a 1.00 mm-diameter plastic optical fiber 10a formed of a core 16 of a refractive index $n_1$ of 1.5 coated with a clad 17 of a refractive index $n_2$ of 1.48, is thermally drawn to form a light branching and coupling fiber portion 13a and form tapering fiber portions 12a and 14a and light transmission fiber portions 11a and 15a at opposite ends of the light branching and coupling fiber portion 13a. An optical fiber 10b is formed in a similar manner to that described above.

The numerical aperture NA of the optical fiber 10a is set to 0.244 on the basis of the aforementioned expression 1, and the critical angle $\theta_1$ of the light 20 of the optical fiber 10a with respect to the fiber optical axis is set to 9.37° on the basis of the expression 3.

Further, to prevent the light 20 from leaking in the light branching and coupling fiber portions 13a and 13b, the range of $9.37<\theta_2<42.51$ is required on the basis of the aforementioned expression 4. In this embodiment, $\theta_2$ is set to 20° so that the numerical aperture is equivalent to about 0.5.

In this end, it is apparent from the expressions 7 and 9 that the angle $\psi$ of the tapering fiber portions 12a, 14a, 12b and 14b with respect to the fiber optical axis may be set to about 5° and the length h of the tapering fiber portions may be set to 2.22 mm.

In this occasion, the diameter of the light branching and coupling portions 13a and 13b is made 0.63 mm on the basis of the expression 12.

When the length of the light branching and coupling fiber portions 13a and 13b is then set to 20 mm in this embodiment and the light branching and coupling fiber portions 13a and 13b are ultrasonically fused with each other substantially over the whole region of the portions 13a and 13b, a light branching and coupling device as shown in FIG. 12 is configured.

In an experiment upon the distributing performance and loss of this light branching and coupling device, the distributing ratio is improved from 1:2 to 1:1.4 compared with the conventional case where optical fibers with the numerical aperture of 0.25 are fused with each other. This value is equivalent to the value obtained in the case where optical fibers with the numerical aperture of 0.5 are fused with each other. Further, the loss of excess is suppressed within 1 dB, so that a light branching and coupling device of low loss is obtained.

In this light branching and coupling device, an optical adhesive agent of a refractive index smaller than the refractive index of the clad 17 of the optical fibers 10a and 10b may be applied onto circumferential surfaces of the light branching and coupling fiber portions 13a and 13b fused with each other and onto circumferential surfaces of the tapering fiber portions 12a, 14a, 12b and 14b. As an example of the optical adhesive agent, there is an adhesive agent with the refractive index of 1.479, DEFENSA, OP-48 made by Dai Nippon Ink & Chemicals Inc.

Of course, an adhesive agent with the refractive index $n_3$ of 1.39 or smaller as represented by the expression 11 is more preferably used so that light is fully reflected by the boundary between the clad and the optical adhesive agent.

Fourth Embodiment

A light branching and coupling device of a fourth embodiment according to the present invention will be described below.

Figure 13:
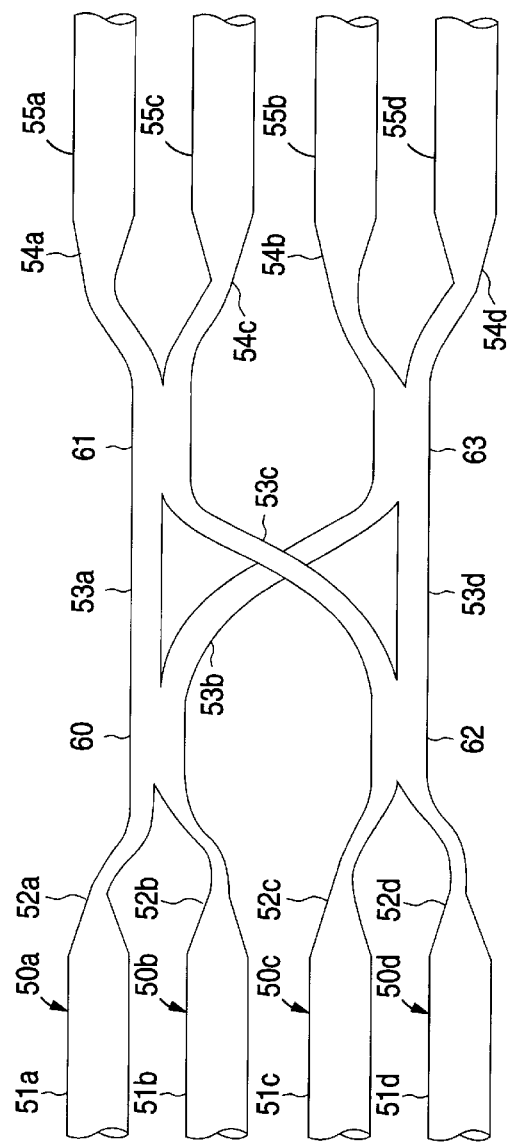
FIG. 13 is a view showing a fourth embodiment according to the present invention.

As shown in FIG. 13, this light branching and coupling device is a 4-input 4-output type star-like light branching and coupling device composed of four optical fibers 50a to 50d.

Each of the aforementioned optical fibers 50a to 50d is formed of a core coated with a clad. The respective center portions of the optical fibers 50a to 50d are thermally drawn to form light branching and coupling fiber portions 53a to 53d and, at the same time, to form light transmission fiber portions 51a to 51d and 55a to 55d on opposite end sides of the light branching and coupling fiber portions 53a to 53d. The diameter of the aforementioned light branching and coupling fiber portions 53a to 53d is set to be smaller than the diameter of the light transmission fiber portions 51a to 51d and 55a to 55d and, at the same time, tapering fiber portions 52a to 52d and 54a to 54d of the same shape are formed continuously between the light branching and coupling fiber portions 53a to 53d and the light transmission fiber portions 51a to 51d and 55a to 55d respectively so that the outer circumferences of the tapering fiber portions 52a to 52d and 54a to 54d are gradually reduced in diameter toward the light branching and coupling fiber portions 53a to 53d.

The light branching and coupling fiber portions 53a to 53d of the optical fibers 50a to 50d are partially ultrasonically fused with each other at different positions.

That is, the light branching and coupling fiber portion 53a and the light branching and coupling fiber portion 53b are partially fused with each other to form a fused portion 60 and, at the same time, the light branching and coupling fiber portion 53a and the light branching and coupling fiber portion 53c are partially fused with each other at an axially different position of the light branching and coupling fiber portion 53a to form a fused portion 61. Further, the light branching and coupling fiber portion 53c and the light branching and coupling fiber portion 53d are fused with each other to form a fused portion 62 and, at the same time, the light branching and coupling fiber portion 53d and the light branching and coupling fiber portion 53b are fused with each other at an axially different position of the light branching and coupling fiber portion 53d to form a fused portion 63.

In the star-like light branching and coupling device thus configured, light given from the light transmission fiber portion 51a of the optical fiber 50a is distributed into the light branching and coupling fiber portions 53a and 53b through the fused portion 60. The light thus distributed into the light branching and coupling fiber portion 53a is distributed into the light branching and coupling fiber portions 53a and 53c through the fused portion 61 so as to be distributed into the light transmission fiber portions 55a and 55c respectively. On the other hand, the light distributed into the light branching and coupling fiber portion 53b is distributed into the light branching and coupling fiber portions 53b and 53d through the fused portion 63 so as to be distributed into the light transmission fiber portions 55b and 55d respectively. Accordingly, light given from the light transmission fiber portion 51a of the optical fiber 50a is outputted from the light transmission fiber portions 55a to 55d of the all optical fibers 50a to 50d respectively.

Further, even in the case where light is given from any one of the light transmission fiber portions 51b to 51d, the light is distributed into all the light transmission fiber portions 55a to 55d and outputted therefrom in the same manner as described above.

In the star-like light branching and coupling device configured as described above, the angle of light in the light branching and coupling fiber portions 53a to 53d with respect to the fiber optical axis can be set to be larger than the angle of light in the light transmission fiber portions 51a to 51d and 55a to 55d with respect to the fiber optical axis by the tapering fiber portions 52a to 52d and 54a to 54d formed at opposite ends of the light branching and coupling fiber portions 53a to 53d respectively. Accordingly, in the light transmission fiber portions 51a to 51d and 55a to 55d, the angle of light is small so that light transmitting performance is improved and, at the same time, in the light branching and coupling fiber portions 53a to 53d, the angle of light is large so that the light goes into and out of the boundary surface between the light branching and coupling fiber portions 53a and 53d. Accordingly, there arises an effect that distributing performance is improved.

Incidentally, the inclination angle of the circumferences of the tapering fiber portions 52a to 52d and 54a to 54d of the optical fibers 50a to 50d with respect to the fiber optical axis and the length thereof may be set in the same manner as in the aforementioned first embodiment.

An ultraviolet setting optical adhesive agent of a small refractive index may be applied onto the circumferential surfaces of the light branching and coupling fiber portions 53a to 53d and onto the circumferential surfaces of the fused portions 60 to 63 in the same manner as in the second embodiment.

A specific example of this light branching and coupling device will be described below.

That is, plastic optical fibers with the numerical aperture of 0.3 and the diameter of 1 mm are thermally drawn to form optical fibers 50a to 50d having light branching and coupling fiber portions 53a to 53d in which the diameter is set to 0.5 mm. The light transmission fiber portions 53a to 53d thereof are ultrasonically fused with each other in a range of from 10 mm to 20 mm to thereby produce a light branching and coupling device having fused portions 60 to 63.

Further, an ultraviolet setting resin of a small refractive index is applied onto the circumferential surfaces of the light transmission fiber portions 53a to 53d and onto the circumferential surfaces of the fused portions 60 to 63.

When light with the wave length of 660 nm and the power of 34 μW is made incident to the light transmission fiber portion 51a from a stabilized light source, outputs of the light transmission fiber portions 55a, 55c, 55b and 55d are 6.63 μW (insertion loss: 7.1 dB), 5.77 μW (insertion loss: 7.7 dB), 5.91 μW (insertion loss: 7.6 dB) and 5.39 μW (insertion loss: 8.0 dB) respectively. Further, the loss of excess is 1.6 dB.

Incidentally, the insertion loss is expressed by −10×log (output/input in each transmission portion), and the loss of excess is expressed by −10×log (total output/input in all transmission portions).

The values of these insertion losses and of the excess loss are equivalent to the values in a conventional light branching and coupling device formed by fusing four optical fibers with the numeral aperture of 0.5 to each other without any change of the shape thereof. That is, a light branching and coupling device having distributing performance equivalent to the light branching performance formed by optical fibers with the high numerical aperture (=0.5) is produced from optical fibers excellent in transmitting performance but with low numerical aperture (=0.3).

Fifth Embodiment

Figure 14:
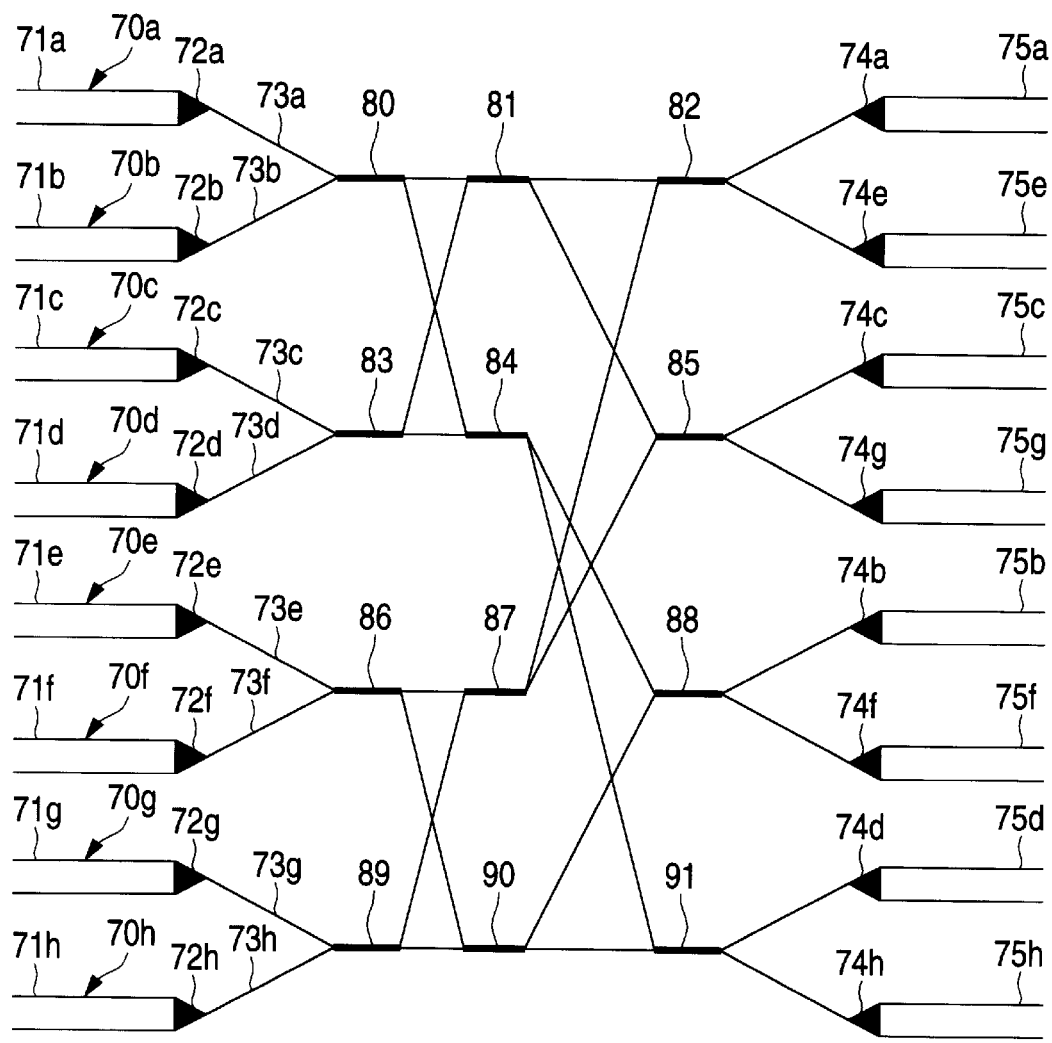
FIG. 14 is a view showing a fifth embodiment according to the present invention.
Figure 15:
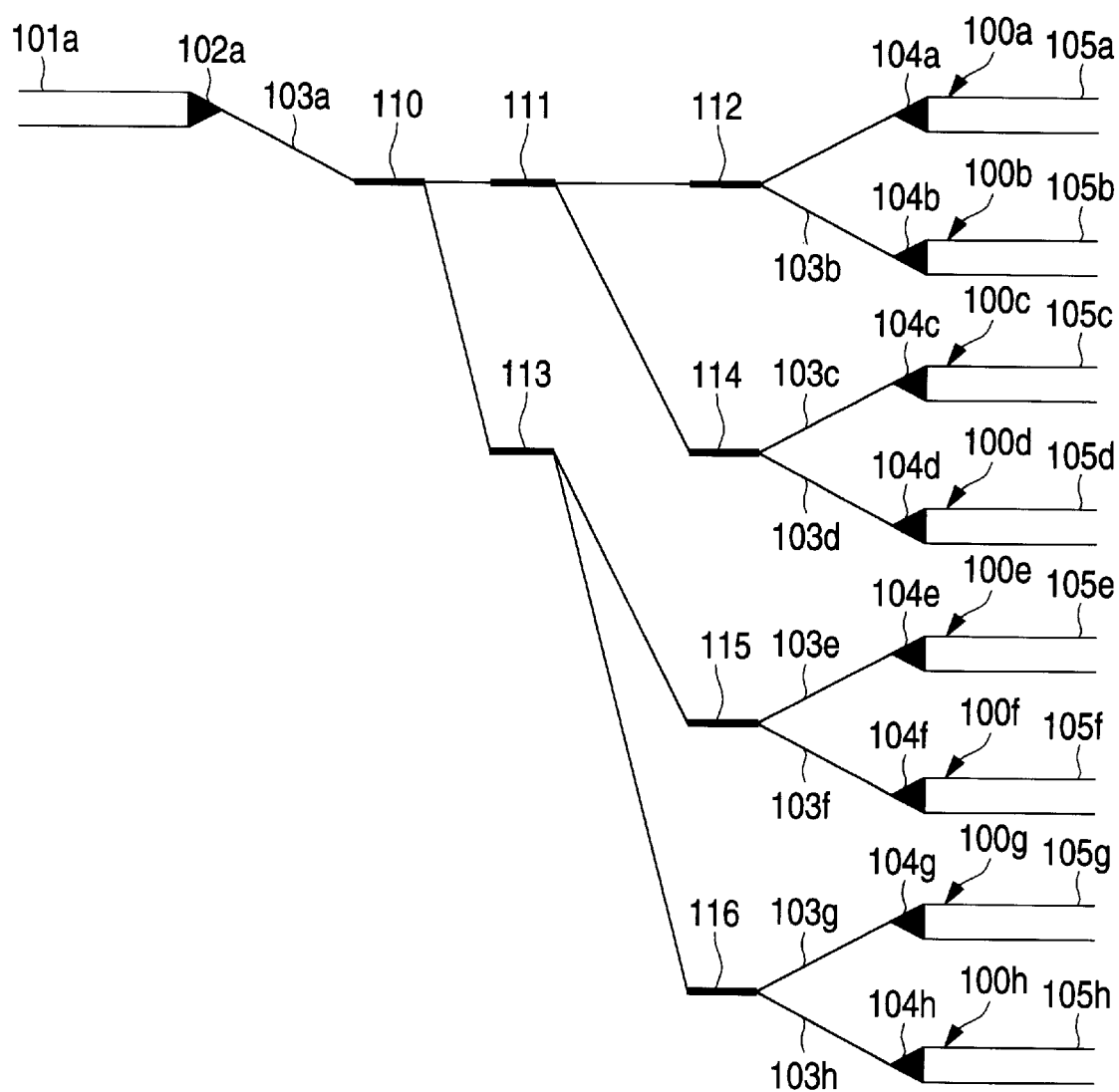
FIG. 15 is a view showing a sixth embodiment according to the present invention.
Figure 16:
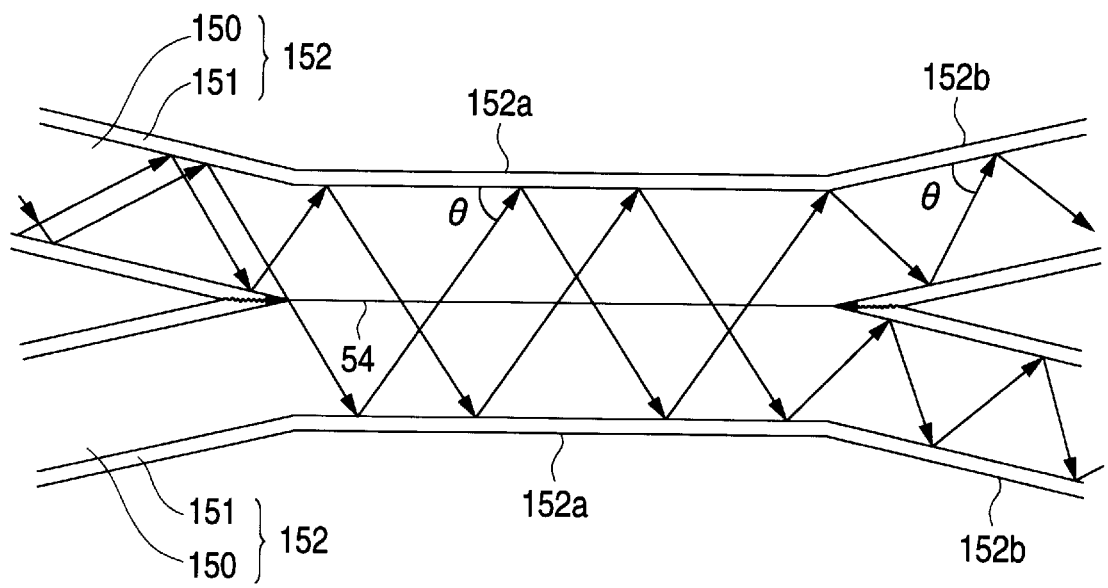
FIG. 16 is an explanatory view showing a conventional device.
Figure 17:
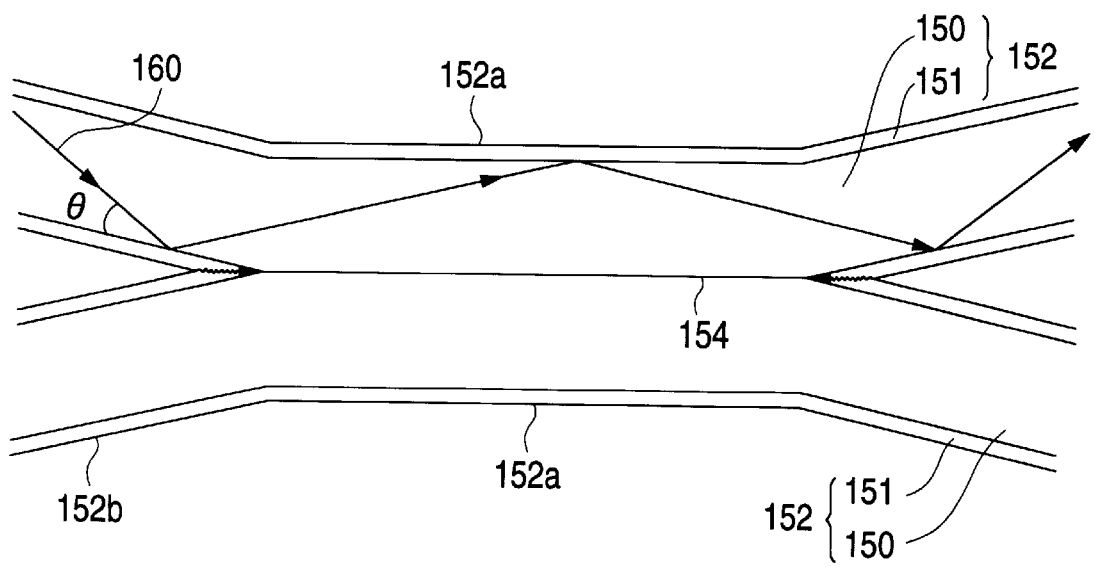
FIG. 17 is an explanatory view showing another conventional device.

FIG. 14 is a view showing a light branching and coupling device in a fifth embodiment according to the present invention.

This light branching and coupling device is an 8-input 8-output type star-like light branching and coupling device composed of eight optical fibers 71a to 71h. The optical fibers 71a to 71h have tapering fiber portions 72a to 72h and 74a to 74h and light transmission fiber portions 71a to 71h and 75a to 75h at opposite ends of light branching and coupling fiber portions 73a to 73h respectively, similarly to the optical fibers according to the first to fourth embodiments described above.

Further, the light branching and coupling fiber portion 73a of the optical fiber 70a is partially fused with the light branching and coupling fiber portions 73b, 73c and 73e in fused portions 80, 81 and 82 located in different positions along the axial direction of the light branching and coupling fiber portion 73a. The light branching and coupling fiber portion 73b of the optical fiber 70b is partially fused with the light branching and coupling fiber portions 73a, 73d and 73f in fused portions 80, 84 and 88 located in different positions along the axial direction of the light branching and coupling fiber portion 73b. The light branching and coupling fiber portion 73c of the optical fiber 70c is partially fused with the light branching and coupling fiber portions 73d, 73a and 73g in fused portions 83, 81 and 85 located in different positions along the axial direction of the light branching and coupling fiber portion 73c. The light branching and coupling fiber portion 73d of the optical fiber 70d is partially fused with the light branching and coupling fiber portions 73c, 73b and 73h in fused portions 83, 84 and 91 located in different positions along the axial direction of the light branching and coupling fiber portion 73d. The light branching and coupling fiber portion 73e of the optical fiber 70e is partially fused with the light branching and coupling fiber portions 73f, 73g and 73a in fused portions 86, 87 and 82 located in different positions along the axial direction of the light branching and coupling fiber portion 73e. The light branching and coupling fiber portion 73f of the optical fiber 70f is partially fused with the light branching and coupling fiber portions 73e, 73h and 73b in fused portions 86, 90 and 88 located in different positions along the axial direction of the light branching and coupling fiber portion 73f. The light branching and coupling fiber portion 73g of the optical fiber 70g is partially fused with the light branching and coupling fiber portions 73h, 73e and 73c in fused portions 89, 87 and 85 located in different positions along the axial direction of the light branching and coupling fiber portion 73g. The light branching and coupling fiber portion 73h of the optical fiber 70h is partially fused with the light branching and coupling fiber portions 73g, 73f and 73d in fused portions 89, 90 and 91 located in different positions along the axial direction of the light branching and coupling fiber portion 73h.

In this light branching and coupling device, light made incident to the transmission portion 71a is distributed into the light branching and coupling fiber portions 73a and 73b through the fused portion 80. The light thus distributed into the light branching and coupling fiber portion 73a is distributed into the light branching and coupling fiber portions 73a and 73c through the fused portion 81. The light thus distributed into the light branching and coupling fiber portion 73a is distributed into the light branching and coupling fiber portions 83a and 73e through the fused portion 82 so as to be outputted to the light branching and coupling fiber portions 75a and 75e. On the other hand, the light distributed into the light branching and coupling fiber portion 73c through the fused portion 81 is distributed into the light branching and coupling fiber portions 73c and 73g through the fused portion 85 so as to be outputted to the light transmission fiber portions 75c and 75g.

On the other hand, the light distributed into the light branching and coupling fiber portion 73b through the fused portion 80 is distributed into the light branching and coupling fiber portions 73b and 73d through the fused portion 84. The light thus distributed into the light branching and coupling fiber portion 73b is distributed into the light branching and coupling fiber portions 73b and 73f through the fused portion 88 so as to be outputted to the light transmission fiber portions 75b and 75f. On the other hand, the light distributed into the light branching and coupling fiber portion 73d is distributed into the light branching and coupling fiber portions 73f and 73h through the fused portion 91 so as to be outputted to the light transmission fiber portions 75d and 75h.

Accordingly, light given from the light transmission fiber portion 71a is distributed and outputted into the all light transmission fiber portions 75a to 75h.

Incidentally, also in the case where light is given from any one of the light transmission fiber portions 71b to 71h, the light is outputted to the light transmission fiber portions 75a to 75h respectively.

Further, the inclination angle of the circumferential surfaces of the tapering fiber portions 72a to 72h and 74a to 74h of the optical fibers 70a to 70h with respect to the fiber optical axis and the length thereof may be set in the same manner as in the aforementioned first embodiment.

The same ultraviolet setting optical adhesive agent of a small refractive index as in the second embodiment may be applied onto the circumferential surfaces of the light branching and coupling fiber portions 73a to 73h and onto the circumferential surfaces of the fused portions 80 to 91.

In the star-like light branching and coupling device configured as described above, the angle of light in the light branching and coupling fiber portions 73a to 73h with respect to the fiber optical axis can be set to be larger than the angle of light in the light transmission fiber portions 71a to 71h and 75a to 75h with respect to the fiber optical axis by the tapering fiber portions 72a to 72h and 74a to 74h formed at opposite ends of the light branching and coupling fiber portions 73a to 73h. Accordingly, in the light transmission fiber portions 71a to 71h and 75a to 75h, the angle of light is small so that light transmitting performance is improved and, at the same time, in the light branching and coupling fiber portions 73a to 73h, the angle of light is large so that the light goes in and out of the boundary surface between the light branching and coupling fiber portions 73a and 73h. Accordingly, there arises an effect that distributing performance is improved.

A specific example of this light branching and coupling device will be described below.

That is, plastic optical fibers with the numerical aperture of 0.3 and the diameter of 1 mm are thermally drawn to form optical fibers 70a to 70h having light branching and coupling fiber portions 73a to 73h in which the diameter is set to 0.5 mm. The light branching and coupling fiber portions 73a to 73h are ultrasonically fused with each other in a range of from 10 mm to 20 mm to thereby produce a light branching and coupling device having fused portions 80 to 91.

Further, an ultraviolet setting resin of a small refractive index is applied onto the circumferential surfaces of the light branching and coupling fiber portions 73a to 73h and onto the circumferential surfaces of the fused portions 80 to 91.

When light with the wave length of 660 nm and the power of 34 $\mu$W is made incident to the light transmission fiber portion 71a from a stabilized light source, outputs of the light transmission fiber portions 75a to 75h are as follows in descending order from the right upper in FIG. 14: 4.63 $\mu$W (insertion loss: 8.66 dB) in the light transmission fiber portion 75a; 3.08 $\mu$W (insertion loss: 10.42 dB) in the light transmission fiber portion 75e, 3.12 $\mu$W (insertion loss: 10.37 dB) in the light transmission fiber portion 75c, 2.16 $\mu$W (insertion loss: 11.97 dB) in the light transmission fiber portion 75g, 2.99 $\mu$W (insertion loss: 10.55 dB) in the light transmission fiber portion 75b, 1.98 $\mu$W (insertion loss: 12.34 dB) in the light transmission fiber portion 75f, 2.10 $\mu$W (insertion loss: 12.09 dB) in the light transmission fiber portion 75d, 1.41 $\mu$W (insertion loss: 13.82 dB) in the light transmission fiber portion 75h. Further, the loss of excess is 1.99 dB. With respect to the values of these insertion losses and of the excess loss, there is obtained distributing performance equivalent to that in the case where a conventional 8-input 8-output type star-like light coupler having no tapering fiber portion is produced from optical fibers with the numerical aperture (=0.5).

A light branching and coupling device according to a sixth embodiment will be described below.

Sixth Embodiment

This light branching and coupling device is a 1-input 8-output type tree-like light coupler which is composed of eight optical fibers 100a to 100h.

The optical fiber 100a has tapering fiber portions 102a and 104a and light transmission fiber portions 101a and 105a at opposite ends of light branching and coupling fiber portion 103a formed by thermally drawing the center portion thereof in the same manner as in the first embodiment.

Further, the optical fibers 100b to 100h have light branching and coupling fiber portions 103b to 103h formed by thermally drawing one end thereof, and light transmission fiber portions 105b to 105h on the other end thereof. Tapering fiber portions 104b to 104h are formed continuously between the light branching and coupling fiber portions and the light transmission fiber portions so that the outer circumferences of the tapering fiber portions 104b to 104h are tapered off so as to be gradually reduced in diameter toward the light branching and coupling fiber portions.

Further, the light branching and coupling fiber portion 103a of the optical fiber 100a is partially fused with the light branching and coupling fiber portions 103e, 103c and 103b at fused portions 110, 111 and 112 located in difference positions along the axial direction thereof. The light branching and coupling fiber portion 103b of the optical fiber 100b is partially fused with the light branching and coupling fiber portion 103a at the fused portion 112. The light branching and coupling fiber portion 103c of the optical fiber 100c is partially fused with the light branching and coupling fiber portions 103d and 103b at fused portions 111 and 114 located in difference positions along the axial direction thereof. The light branching and coupling fiber portion 103d of the optical fiber 100d is partially fused with the light branching and coupling fiber portion 103c at the fused portion 114. The light branching and coupling fiber portion 103e of the optical fiber 100e is partially fused with the light branching and coupling fiber portions 103f, 103g and 103a at fused portions 115, 113 and 110 located in difference positions along the axial direction thereof. The optical fiber 100f is partially fused with the light branching and coupling fiber portion 103e at the fused portion 115. The light branching and coupling fiber portion 103g of the optical fiber 100g is partially fused with the light branching and coupling fiber portions 103g and 103e at fused portions 116 and 113 located in difference positions along the axial direction thereof. The light branching and coupling fiber portion 103h of the optical fiber 100h is partially fused with the light branching and coupling fiber portion 103g at the fused portion 116.

In this tree-like light branching and coupling device, light given from the light transmission fiber portion 101a is distributed into the light branching and coupling fiber portions 103a and 103e through the fused portion 110. The light thus distributed into the light branching and coupling fiber portion 103a is distributed into the light branching and coupling fiber portions 103a and 103c through the fused portion 111. The light thus distributed into the light branching and coupling fiber portion 103a is distributed into the light branching and coupling fiber portions 103a and 103b through the fused portion 112 so as to be outputted to the light transmission fiber portions 105a and 105b. On the other hand, the light distributed into the light branching and coupling fiber portion 103c is distributed into the light branching and coupling fiber portions 103c and 103d.through the fused portion 114 so as to be outputted to the light transmission fiber portions 105c and 105d.

On the other hand, the light distributed into the light branching and coupling fiber portion 103e through the fused portion 110 is distributed into the light branching and coupling fiber portions 103e and 103g through the fused portion 113. The light thus distributed into the light branching and coupling fiber portion 103e is distributed into the light branching and coupling fiber portions 103e and 103f through the fused portion 115 so as to be outputted to the light transmission fiber portions 105e and 105f. On the other hand, the light distributed into the light branching and coupling fiber portion 103g through the fused portion 113 is distributed into the light branching and coupling fiber portions 103g and 103h through the fused portion 116 so as to be distributed into the light transmission fiber portions 105g and 105h.

Accordingly, when light is inputted from the light transmission fiber portion 101a in the light branching and coupling device, the light is distributed so as to branch at the fused portions 110 to 116 and outputted from the light transmission fiber portions 105a to 105h.

Further, the inclination angle of the circumferential surfaces of the tapering fiber portions 102a and 104a to 104h of the optical fibers 100a to 100h with respect to the fiber optical axis and the length thereof may be set in the same manner as in the aforementioned first embodiment.

The same ultraviolet setting optical adhesive agent of a small refractive index as in the second embodiment may be applied onto the circumferential surfaces of the light branching and coupling fiber portions 103a to 103h and onto the circumferential surfaces of the fused portions 110 to 116.

In the tree-like light branching and coupling device configured as described above, the angle of light in the light branching and coupling fiber portions 103a to 103h with respect to the fiber optical axis can be set to be larger than the angle of light in the light transmission fiber portions 101a and 105a to 105h with respect to the fiber optical axis by the tapering fiber portions 102a and 104a to 104h formed between the light branching and coupling fiber portions 103a to 103h and the light transmission fiber portions 101a and 105a to 105h, respectively. Accordingly, in the light transmission fiber portions 101a and 105a to 105h, the angle of light is small so that light transmitting performance is improved and, at the same time, in the light branching and coupling fiber portions 103a to 103h, the angle of light is large so that the light goes into and out of the boundary surface between the light branching and coupling fiber portions 103a and 103h. Accordingly, there arises an effect that distributing performance is improved.

A specific example of this light branching and coupling device will be described below.

That is, plastic optical fibers with the numerical aperture of 0.3 and the diameter of 1 mm are thermally drawn to form optical fibers 10a to 100h having light branching and coupling fiber portions 103a to 103h in which the diameter is set to 0.5 mm. The light branching and coupling fiber portions 103a to 103h are ultrasonically fused with each other in a range of from 10 mm to 20 mm to thereby produce a light branching and coupling device having fused portions 110 to 116.

Further, an ultraviolet setting resin of a small refractive index is applied onto the circumferential surfaces of the light branching and coupling fiber portions 103a to 103h and onto the fused portions 110 to 116.

When light with the wave length of 660 nm and the power of 34 $\mu$W is made incident to the light transmission fiber portion 101a from a stabilized light source, the same distributing performance as in the aforementioned third embodiment is obtained.

Incidentally, the form of the star-like light branching and coupling device and tree-like light branching and coupling device in the fourth, fifth and sixth embodiments is not limited to the above description. For example, the present invention can be applied to a 16-input 16-output type star-like light branching and coupling device, a 1-input 4-output type tree-like light branching and coupling device, or the like.

Further, the fusion of the light branching and coupling fiber portions in the aforementioned first to sixth embodiments is not limited to ultrasonic fusion. Alternatively, thermal fusion may be used.

Although the embodiments have been described upon the case where light is distributed, the present invention can be applied to the case where light transmitted from a plurality of light transmission fiber portions is coupled by light branching and coupling fiber portions.

As described above, according to the present invention, the angle of light in the light transmission fiber portion with respect to the fiber optical axis can be set to be small and, at the same time, the angle of light in the light branching and coupling fiber portion with respect to the fiber optical axis can be set to be large. Accordingly, not only light transmitting performance in the light transmission fiber portion is improved but also light distributing performance or light coupling performance in the light branching and coupling fiber portion is improved.

Further, when the light branching and coupling device is composed of three or more optical fibers and a plurality of fused portions formed by fusing light branching and coupling portions of predetermined ones of the optical fibers with each other are provided along the axial direction of the light branching and coupling fiber portions of the predetermined optical fibers, light inputted to the light branching and coupling device can be distributed into a large number of parts or a large number of light inputs to the light branching and coupling device can be coupled.

Further, when the light transmission fiber portions, the tapering fiber portions and the light branching and coupling fiber portions are integrally formed, there is no light loss in the boundary therebetween.

Further, when the inclination of the tapering fiber portion with respect to the fiber optical axis and the length of the tapering fiber portion are set so that the angle $\theta_2$ of light advancing in the light branching and coupling fiber portion with respect to the fiber optical axis satisfies the following condition in which the light is fully reflected by the outer circumference of a clad of the light branching and coupling fiber portion:

$$\theta_2 \leq \sin^{-1}(1/n_2),$$

the light is prevented from being leaked out of the light branching and coupling fiber portions. Accordingly, the loss of light is avoided, so that transmitting performance is improved.

With respect to the inclination of the tapering fiber portion with respect to the fiber optical axis and the length of the tapering fiber portion, when, for example, the aforementioned inclination $\psi$ of the tapering fiber portion with respect to the fiber optical axis are set as follows:

$$\psi = (\theta_2 - \theta_1)/2$$

and the length h of the tapering fiber portion is set as follows:

$$h = D/(\tan \psi + \tan \theta_2)$$

in which the diameter of the light transmission fiber portion is D, light entering the light branching and coupling fiber portion from the light transmission fiber portion is reflected only once by the circumferential surface of the tapering fiber portion. Accordingly, the angle of light in the light branching and coupling fiber portion with respect to the fiber optical axis is made $\theta_2$.

Further, when an optical adhesive agent having a refractive index smaller than that of the clad of the optical fibers is applied onto the circumferential surfaces of the light branching and coupling fiber portions and onto the circumferential surfaces of the tapering fiber portions, the mechanical strength of the light branching and coupling fiber portions and the tapering fiber portions in which the diameter is set to be small is improved.

Further, when an optical adhesive agent having the refractive index of $n_3$ satisfying the condition $$n_3 < n_2 \cdot \sin \theta_2$$

is applied, not only the mechanical strength of the light branching and coupling fiber portions and the tapering fiber portions is improved but also light is fully reflected by the boundary surface between the clad and the optical adhesive agent so that the light can be effectively prevented from being leaked.

What is claimed is:

1. A light branching and coupling device, comprising:
   at least three optical fibers, each optical fiber extending along a fiber optical axis and having:
      a light transmission fiber portion;
      a light branching and coupling fiber portion divided into a plurality of contiguous fiber portion segments, a diameter of said light branching and coupling fiber portion being set to be smaller than a diameter of said light transmission fiber portion; and
      a tapering fiber portion continuously formed between said light branching and coupling fiber portion and said light transmission fiber portion so that an outer circumferential surface of the tapering fiber portion is gradually tapered to reduce its diameter toward the light branching and coupling fiber portion;
   wherein said light branching and coupling fiber portions of the at least three optical fibers are fused to each other along the fiber optical axis at respective ones of the fiber portion segments.

2. A light branching and coupling device according to claim 1, wherein said optical fibers are fused with each other in the form of a star.

3. A light branching and coupling device according to claim 1, wherein said optical fibers are fused with each other in the form of a tree.

4. A light branching and coupling device according to claim 1, wherein an optical adhesive agent is applied onto the circumferences of said light branching and coupling fiber portions fused with each other and onto the circumferences of said tapering fiber portions, wherein said optical adhesive agent has a refractive index $n_3$ which satisfies the condition $$n_3 < n_2 \cdot \sin \theta_2$$

where the angle $\theta_2$ of light advancing in the light branching and coupling fiber portion with respect to the fiber optical axis is given as follows:

$$\theta_2 < \sin^{-1}(1/n_2).$$

5. A light branching and coupling device, comprising:
   at least three optical fibers, each optical fiber extending along a fiber optical axis and including:
      a light transmission fiber portion;
      a light branching and coupling fiber portion, a diameter of said light branching and coupling fiber portion being set to be smaller than a diameter of said light transmission fiber portion; and
      a tapering fiber portion continuously formed between said light branching and coupling fiber portion and said light transmission fiber portion so that an outer circumferential surface of said tapering fiber portion is gradually tapered to reduce its diameter toward the light branching and coupling fiber portion;
   wherein said the light branching and coupling fiber portions of the at least three optical fibers being fused to each other, and
   wherein an inclination angle $\psi$ of the outer circumferential surface of said tapering fiber portion with respect to the fiber optical axis is set as follows:

$$\psi = (\theta_2 - \theta_1)/2$$

when the critical angle of light advancing in said light transmission fiber portion with respect to the fiber optical axis is $\theta_1$, and a length h of said tapering fiber portion is set as follows:

$$h = D/(\tan \psi + \tan \theta_2)$$

when a diameter of said light transmission fiber portion is D.

6. A light branching and coupling device, comprising:
   at least three optical fibers, each optical fiber extending along a fiber optical axis and including:
      a light transmission fiber portion;
      a light branching and coupling fiber portion, a diameter of said light branching and coupling fiber portion being set to be smaller than a diameter of said light transmission fiber portion; and
      a tapering fiber portion continuously formed between said light branching and coupling fiber portion and said light transmission fiber portion so that an outer circumferential surface of said tapering fiber portion is gradually tapered to reduce its diameter toward the light branching and coupling fiber portion;
   wherein said the light branching and coupling fiber portions of the at least three optical fibers being fused to each other, and
   wherein an optical adhesive agent having a refractive index smaller than that of a clad coating of a core of said optical fibers is applied onto a circumferential surface of said light branching and coupling fiber portions of the at least three optical fibers fused to each other and onto the outer circumferential surface of said tapering fiber portion of the at least three optical fibers.

* * * * *